United States Patent Office 2,960,510
Patented Nov. 15, 1960

2,960,510

PREPARATION OF DIACETONE 2-KETOGULONIC ACID

James E. Slager, Holland, Mich., assignor to Miles Laboratories, Inc., Elkhart, Ind., a corporation of Indiana No Drawing. Filed July 14, 1958, Ser. No. 748,138

8 Claims. (Cl. 260—340.7)

This invention relates to the preparation of diacetone 2-ketogulonic acid, and is particularly concerned with a process for producing this acid from diacetone 1-sorbose by chemical oxidation of the latter. A simplified representation of the oxidation reaction is as follows:

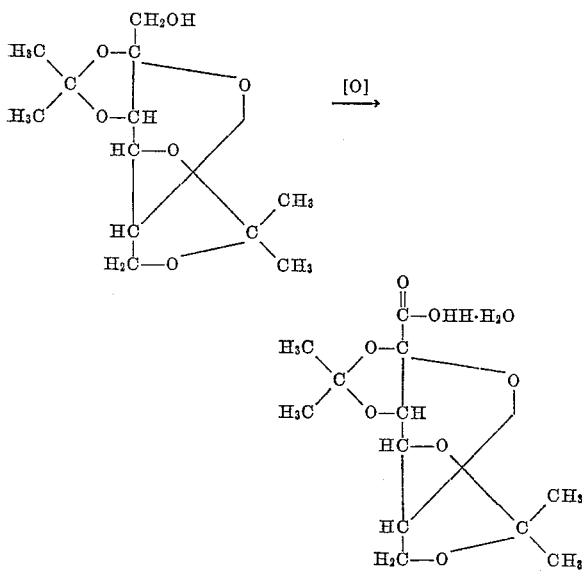

Diacetone 2-ketogulonic acid is useful chiefly as a source of 2-ketogulonic acid to which it may be readily hydrolyzed. The 2-ketogulonic acid in turn is an important intermediate in the synthesis of ascorbic acid (vitamin C) to which it is converted by procedures well known in the art.

The conversion of diacetone 1-sorbose by oxidation to diacetone 2-ketogulonic acid is not new per se. In accordance with certain prior art methods with which I am acquainted, chemical oxidizing agents such as potassium permanganate and dilute nitric acid are used to effect the conversion; in other proir art methods the oxidation of diacetone 1-sorbose is achieved by the use of oxygen in the presence of a platinum catalyst, or with various hypochlorides in the presence of a nickel or palladium catalyst. However, none of the prior art methods has won commercial acceptance since they are either inefficient and produce only poor yields of product, or are competitively impracticable because of the high cost of the materials employed.

In my joint copending application with Norman D. Dawson, Serial No. 748,137 filed concurrently herewith, there is described a process for oxidizing diacetone 1-sorbose by means of bromine in the presence of an oxidation catalyst, wherein bromide ions resulting from the reduction of bromine in the oxidation reaction are oxidized electrolytically to free bromine for re-use in oxidizing additional amounts of diacetone 1-sorbose. The instant application is also concerned with the oxidation of diacetone 1-sorbose with bromine, but differs from the electrolytic process in that chlorine is used to oxidize the promide ions resulting from the reduction of bromine in the oxidation of the diacetone 1-sorbose.

It is an object of the invention to provide a simple easily controllable process of oxidizing diacetone 1-sorbose to diacetone 2-ketogulonic acid, which process uses relatively inexpensive reactants, and produces efficiently a product having a high degree of purity.

An additional object is to provide a process of the character referred to in the preceding object, wherein the diacetone 1-sorbose is oxidized in aqueous solution by means of bromine in the presence of a water-soluble inorganic nitrite or nitrate acting as an oxidation catalyst.

A further, more specific object is to provide a process as defined in the foregoing object wherein the oxidation with bromine takes place in the presence of chlorine.

Other objects and advantages of the invention will become apparent from the description thereof which follows.

Briefly speaking, in practicing the present invention diacetone 1-sorbose in aqueous solution is oxidized by treatment with bromine in the presence of chlorine, a chemical oxidation catalyst and a pH control agent effective to maintain the solution neutral or nearly neutral (i.e., at a pH between about 6.5 and about 8.0) during the course of the oxidation treatment. While the oxidation reaction, which is exothermic in character, proceeds the temperature of the reaction mixture is preferably maintained above room temperature, e.g., between about 45° and 55° C., by adding or abstracting heat in any convenient manner. Operating temperatures over a much wider range, e.g., 25° to 100° C. may be used if desired. After the oxidation reaction is completed, the solution is cooled preferably to below normal room temperature, e.g., to about 5° to 10° C. The solution is then filtered, and the filtrate acidified preferably to a pH of about 1.0, to preciptate diacetone 2-ketogulonic acid. The precipitated product is then removed from the mother liquor by filtration and washed with a small amount of cold water. The temperature of the solution may be conveniently controlled at all stages by means of a water bath surrounding the reaction vessel, or by equivalent means well known in the art.

The present process may be conveniently carried out in a closed vessel fitted with a dropping funnel, a suitable gas inlet tube, a thermometer, and a mechanical stirrer for mixing the reactants.

In practicing the process, the bromine and chlorine are simply added to the reaction vessel containing the solution of diacetone 1-sorbose in which the oxidation catalyst and pH control agent are also present. The solution is maintained at the desired reaction temperature during the oxidation reaction, and is also preferably stirred.

The rate of additoin of the bromine and chlorine to the other reactants is not critical. However, when the pH control agent is a carbonate or bicarbonate, the addition of the bromine or chlorine is accompanied by the evolution of carbon dioxide which may impose a limitation on the rate at which the bromine and chlorine can be safely added. Therefore, when the pH control agent is capable of evolving carbon dioxide, the addition of the bromine and chlorine to the diacetone 1-sorbose solution must be adjusted so that the evolution of carbon dioxide will be maintained at a rate insufficient to explode or blow the reactants out of the vessel. When suitable precautions are provided for trapping the carbon dioxide formed, or in those instances in which the pH control agent does not evolve carbon dioxide, all the bromine and chlorine may be added at one time.

In order to obtain maximum yields of diacetone 2-ketogulonic acid about 8 equivalents of bromine should be provided for each equivalent of diacetone 1-sorbose in the reaction mixture. More than 8 equivalents of bromine per equivalent of diacetone 1-sorbose may of course be used if desired, but larger proportions of bromine are not necessary for satisfactory conduct of the oxidation. Calculation of equivalents of diacetone 1-sorbose is on the basis of one gram equivalent per mole; bromine and chlorine each contain two gram equivalents per mole.

An important feature of my invention resides in the fact that the oxidation reaction may be carried out quite satisfactorily when part of the bromine is replaced by chlorine. For best results at least one equivalent of bromine per equivalent of diacetone 1-sorbose should be used. That is to say, of the 8 equivalents of bromine optimumly needed for oxidation of each equivalent of diacetone 1-sorbose, up to 7 equivalents of bromine may be replaced by a corresponding number of equivalents of chlorine, thereby making it possible to practice the process by using a major proportion of a gas which is less expensive than bromine and, moreover, easier to handle. I therefore prefer to carry out the oxidation using one equivalent of bromine and 7 equivalents of chlorine per equivalent of diacetone 1-sorbose.

The order in which the bromine and chlorine are added to the diacetone 1-sorbose solution is immaterial. Thus, the bromine may be added first, followed by the addition of the chlorine, or both the bromine and chlorine may be added simultaneously. Also, as pointed out above, there is no limit on the rate at which the bromine and chlorine may be added, except when the pH control agent is capable of evolving carbon dioxide under the conditions of the reaction, in which case the rate of addition of the bromine and chlorine must be maintained slow enough to prevent the evolution of carbon dioxide at a rate which would force the reactants out of the reaction vessel, as mentioned above.

The concentration of diacetone 1-sorbose in the reaction solution is largely a matter of choice, and I have found that the oxidation proceeds satisfactorily with concentrations of diacetone 1-sorbose between about 1% and 10% by weight of the solution. However, we prefer to use the higher concentrations of diacetone 1-sorbose in the reaction solution, e.g., between about 8% and 10% by weight.

As the oxidation catalysts for the present process any water-soluble inorganic nitrite or nitrate, such as ammonium nitrite or nitrate, the alkali metal nitrites or nitrates such as sodium or potassium nitrite or nitrate, or the alkaline earth metal nitrites or nitrates may be used. I prefer to use sodium nitrite as the oxidation catalyst.

The quantities of oxidation catalyst (sodium nitrite) used in Examples 1 and 2 below, to wit, about 0.09 and about 0.07 mole, respectively, per 0.2 mole of diacetone 1-sorbose, are illustrative of the order of concentration of the catalyst effective to promote the oxidation of diacetone 1-sorbose to diacetone 2-ketogulonic acid. However, these proportions are not closely critical. Satisfactory results may be obtained by using between about 0.05 and about 1.0 equivalent of the oxidation catalyst per equivalent of diacetone 1-sorbose, regardless of which member of the aforementioned broad class of oxidation catalysts is used. The concentration which I prefer to use is between about 0.35 and about 0.45 equivalent of oxidation catalyst per equivalent of diacetone 1-sorbose. The equivalent values of the catalysts are determined by the number of anions per molecule of the catalyst. Thus, the alkali metal nitrites and nitrates comprise one gram equivalent per mole; the alkaline earth metal nitrites and nitrates comprise two gram equivalents per mole.

In order for the present process to function, the reaction solution must be maintained within the pH range of from about 6.5 to 8.0, and any buffer or basic material may be employed which is capable of maintaining the pH of the solution within this range. Examples of pH control agents which I have found satisfactory are sodium bicarbonate, sodium hydroxide, potassium hydroxide, magnesium carbonate and sodium acetate. I prefer to use sodium bicarbonate. The amount of such agent used to regulate the pH of the reactant solution in any given instance will, of course, vary with the character of the agent selected. However, the pH of the reactant solution may be readily determined, e. g., by potentiometric methods, and therefore any practitioner of the process will have a clear guide as to the amount of pH control agent which should be added to a given solution to maintain its pH at the desired value of about 6.5 to 8.0.

*Example 1*

There is dissolved in 750 ml. of water, 52 g. (0.2 mole) of diacetone 1-sorbose (93.7% assay), 6 g. of sodium nitrite, and 155 g. of sodium bicarbonate. This mixture is then placed in a liter flask fitted with a dropping funnel, a thermometer, and a mechanical stirrer which mixes the components during the reaction. 128 grams of bromine are added through the dropping funnel over a period of 80 minutes, while the reaction mixture is maintained at a temperature of 50° to 55° C. by any convenient means, as with a water bath. The reaction mixture is maintained at 50° to 55° C. for one hour after the bromine is added, after which it is cooled to 5° to 10° C. and filtered. The filtrate is acidified with concentrated hydrochloric acid to a pH of 1, thereby precipitating the diacetone 2-ketogulonic acid, which is removed by filtration and washed with a small amount of cold water. The product is then dried. Yield: 50 g. of diacetone 2-ketogulonic acid (80% of theoretical).

*Example 2*

There is dissolved in 500 ml. of water, 52 g. (0.2 mole) of diacetone 1-sorbose (93.7% assay), 5 grams of sodium nitrite and 194 grams of sodium bicarbonate. This mixture is then placed in a liter flask fitted with a dropping funnel, thermometer, gas inlet tube, and a mechanical stirrer which mixes the components during the reaction. 20 grams of bromine are added through the dropping funnel over a period of 40 minutes, while the reaction mixture is maintained at a temperature of 50° to 55° C. 68 grams of chlorine are then added over a period of 4¼ hours through the gas inlet tube, while keeping the temperature of the reaction mixture between 50° to 55° C. The reaction mixture is then cooled to 10° C. and filtered, and the filtrate acidified with concentrated hydrochloric acid to a pH of 1, thereby precipitating diacetone 2-ketogulonic acid which is removed by filtration and washed with a small amount of cold water. The product is then air dried. Yield: 50 grams of diacetone 2-ketogulonic acid (80% of theoretical).

*Example 3*

The procedure of Example 2 was repeated using 32 grams of bromine and 57.5 instead of 68 grams of chlorine. The diacetone 1-sorbose assay was 96.9%, and the water used for dissolving the reactants amounted to 750 ml. After a total reaction time of 4 hours, 43 grams of diacetone 2-ketogulonic acid was obtained (71% of theoretical).

*Example 4*

A further run was made similar to Example 2, using the same amount of bromine (20 g.) but with 63 instead of 68 grams of chlorine. The diacetone 1-sorbose assay was 94%. After a total reaction time of 4 hours, 47 grams of diacetone 2-ketogulonic acid was obtained (75% of theoretical).

*Example 5*

There is dissolved in 500 cc. of water, 52 g. (0.2 mole) of diacetone 1-sorbose, 5 g. of sodium nitrite and 194 g. sodium bicarbonate. The mixture is then placed in a liter flask fitted with gas inlet tube, thermometer and mechanical stirrer which mixes the components during reaction. 78 grams chlorine (equivalent to the bromine and chlorine in Example 2) is added over a period of 4½ hours through the gas inlet tube while the temperature of the reaction mixture is maintained between 50° to 55° C. The reaction mixture is then cooled to 10° C., filtered, and the filtrate acidified to a pH of 1 with concentrated hydrochloric acid. No product is isolated.

Comparison of the foregoing examples shows that when chlorine is substituted for part of the bromine in accordance with the present invention (Examples 2, 3 and 4), the yields of diacetone 2-ketogulonic acid are comparable with the yields obtained when bromine alone is used (Example 1) in accordance with the process of the above-mentioned copending application, Serial No. 748,137. When chlorine alone is used in attempting to oxidize diacetone 1-sorbose (Example 5) no diacetone 2-ketogulonic acid is produced.

I claim:

1. A process of producing diacetone 2-ketogulonic acid which comprises treating diacetone 1-sorbose in aqueous solution with a mixture of bromine and chlorine in the presence of an oxidation catalyst selected from the group consisting of ammonium nitrate and nitrate, the alkali metal nitrites and nitrates and the alkaline earth metal nitrites and nitrates, while maintaining the pH of said solution between about 6.5 and 8.0.

2. A process in accordance with claim 1 wherein the total amount of said bromine and chlorine is about 8 equivalents per equivalent of diacetone 1-sorbose, said bromine being used in the amount of at least one equivalent per equivalent of diacetone 1-sorbose.

3. A process in accordance with claim 1 wherein said bromine and chlorine are used in the amount of about one equivalent of bromine and 7 equivalents of chlorine per equivalent of diacetone 1-sorbose.

4. A process in accordance with claim 1 wherein the temperature of the reactants is maintained between about 25° C. and about 100° C.

5. A process of producing diacetone 2-ketogulonic acid which comprises providing an aqueous solution of (a) diacetone 1-sorbose, (b) an oxidation catalyst selected from the group consisting of ammonium nitrite and nitrate, the alkali metal nitrites and nitrates and the alkaline earth nitrites and nitrates, and (c) a pH control agent, oxidizing said diacetone 1-sorbose by the addition to said solution of bromine and chlorine, the total of said bromine and chlorine being about 8 equivalents per equivalent of diacetone 1-sorbose, at least one equivalent of said total being bromine, maintaining said solution at a temperature between 25° C. and 100° C. during said oxidation reaction, said pH control agent maintaining said solution between a pH of about 6.5 and 8.0 during said reaction, cooling the resulting solution to a temperature below room temperature, filtering said cooled solution, and acidifying the resulting filtrate to precipitate diacetone 2-ketogulonic acid.

6. A process in accordance with claim 5 wherein said oxidation catalyst is used in an amount between about 0.05 equivalent and 1.0 equivalent per equivalent of diacetone 1-sorbose.

7. A process of producing diacetone 2-ketogulonic acid which comprises providing an aqueous solution of diacetone 1-sorbose, sodium nitrite and sodium bicarbonate, said diacetone 1-sorbose being present in said solution to the extent of between about 8% and 10% by weight, said sodium nitrite being present in said solution in an amount between about 0.35 and 0.45 equivalent per equivalent of diacetone 1-sorbose, said sodium bicarbonate being used in an amount effective to maintain the pH of said solution between about 6.5 and 8.0 during the subsequent oxidation reaction, oxidizing said diacetone 1-sorbose by adding to said solution about one equivalent of bromine and about 7 equivalents of chlorine per equivalent of diacetone 1-sorbose, maintaining the temperature of said reactants between about 45° and 55° C. during said oxidation reaction, cooling the resulting reaction mixture to about 5° to 10° C., filtering said cooled reaction mixture, and acidifying the resulting filtrate with concentrated hydrochloric acid to a pH of about 1 to precipitate diacetone 2-ketogulonic acid.

8. A process in accordance with claim 1, wherein said oxidation catalyst is used in an amount between about 0.05 equivalent and 1.0 equivalent per equivalent of diacetone 1-sorbose.

References Cited in the file of this patent

UNITED STATES PATENTS

| | | |
|---|---|---|
| 2,367,251 | Weijlard et al. | Jan. 16, 1945 |
| 2,444,924 | Farkas et al. | July 13, 1948 |

UNITED STATES PATENT OFFICE
CERTIFICATION OF CORRECTION

November 15, 1960

Patent No. 2,960,510

James E. Slager

It is hereby certified that error appears in the above numbered patent requiring correction and that the said Letters Patent should read as corrected below.

Column 1, lines 31 to 43, the formula should appear as shown below instead of as in the patent:

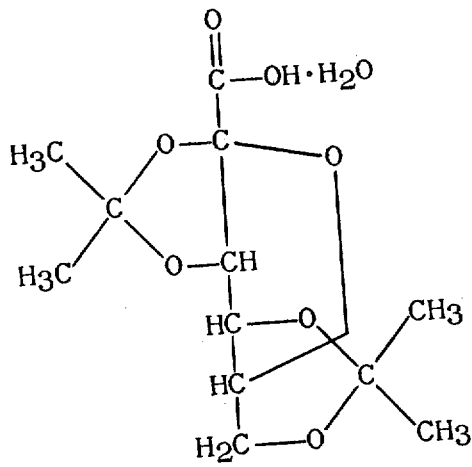

column 5, line 24, for "nitriate" read -- nitrite --.

Signed and sealed this 13th day of June 1961.

(SEAL)
Attest:

ERNEST W. SWIDER
Attesting Officer

DAVID L. LADD
Commissioner of Patents